US012659220B2

(12) United States Patent
Ahmmed et al.

(10) Patent No.: US 12,659,220 B2
(45) Date of Patent: Jun. 16, 2026

(54) NATURAL LANGUAGE PROCESSING (NLP)-BASED AUTOMATED PROCESSES FOR INFORMATION TECHNOLOGY SERVICE PLATFORMS

(71) Applicant: T-Mobile USA, Inc., Bellevue, WA (US)

(72) Inventors: Tanvir Ahmmed, Parsippany, NJ (US); Prabha Jayaram, Cranbury, NJ (US); Krishnan Prashanth, College Station, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 526 days.

(21) Appl. No.: 18/308,553

(22) Filed: Apr. 27, 2023

(65) Prior Publication Data

US 2024/0364583 A1     Oct. 31, 2024

(51) Int. Cl.
*H04L 41/0663* (2022.01)
*H04L 41/50* (2022.01)

(52) U.S. Cl.
CPC ...... *H04L 41/0663* (2013.01); *H04L 41/5032* (2013.01)

(58) Field of Classification Search
CPC ..................... H04L 41/0663; H04L 41/5032
See application file for complete search history.

(56) References Cited

U.S. PATENT DOCUMENTS

| | | |
|---|---|---|
| 7,099,938 B2 | 8/2006 | Hermann et al. |
| 7,729,286 B2 | 6/2010 | Mishra |
| 8,051,154 B2 | 11/2011 | Benny et al. |
| 8,161,326 B2 | 4/2012 | Dixit et al. |
| 8,442,563 B2 | 5/2013 | Chen et al. |
| 8,799,449 B2 | 8/2014 | Schuckenbrock et al. |
| 9,038,086 B2 | 5/2015 | Dees et al. |
| 9,122,745 B2 | 9/2015 | Akolkar et al. |
| 9,715,496 B1 * | 7/2017 | Sapoznik ............. G06Q 30/016 |
| 9,836,282 B2 | 12/2017 | Salle et al. |

(Continued)

FOREIGN PATENT DOCUMENTS

| | | |
|---|---|---|
| EP | 1244251 B1 | 10/2016 |
| WO | 2010068882 A2 | 6/2010 |

(Continued)

*Primary Examiner* — Brian J. Gillis
*Assistant Examiner* — Chhian (Amy) Ling
(74) *Attorney, Agent, or Firm* — Perkins Coie LLP

(57) ABSTRACT

An information technology (IT) service platform that provides technical improvements to IT service management (ITSM) and IT operation management (ITOM) is configured to monitor and detect natural language queries related to IT network nodes and fault management alarming thereof in multiple communication channels. The IT service platform is further configured to map a detected natural language query to one of a catalog of pre-defined IT services. The IT service platform is further configured to use current alarming states or information to determine a complexity of the detected natural language query, and the complexity controls whether the IT service platform executes an automated process to perform the mapped IT service, or generates a data record that is flagged to a platform user to manually perform the mapped IT service.

20 Claims, 17 Drawing Sheets

(56)                    References Cited

U.S. PATENT DOCUMENTS

| | | |
|---|---|---|
| 9,864,798 B2 | 1/2018 | Hall et al. |
| 9,930,046 B2 | 3/2018 | Choe et al. |
| 10,887,157 B1 | 1/2021 | Fletcher et al. |
| 10,931,739 B2 | 2/2021 | Camargo |
| 10,956,255 B1 | 3/2021 | Al-bahar et al. |
| 11,062,088 B2 | 7/2021 | Anerousis et al. |
| 11,182,163 B1 | 11/2021 | Beals et al. |
| 11,223,547 B1 | 1/2022 | Chawla et al. |
| 11,249,836 B2 | 2/2022 | Al-bahar et al. |
| 2009/0187413 A1 | 7/2009 | Abels et al. |
| 2016/0085856 A1* | 3/2016 | Hall .................... G06F 16/3346 |
| | | 707/739 |
| 2016/0294667 A1* | 10/2016 | Prabhakar ............. H04L 67/561 |
| 2018/0218305 A1 | 8/2018 | Shah et al. |
| 2019/0103111 A1* | 4/2019 | Tiwari ................ G06F 16/3329 |
| 2019/0179894 A1* | 6/2019 | Anerousis ................. G06F 8/70 |
| 2019/0236171 A1* | 8/2019 | Mathur ................ G06F 16/215 |
| 2020/0050675 A1* | 2/2020 | Sripada ................. G06F 40/169 |
| 2020/0145283 A1* | 5/2020 | Zeng ................... H04L 43/0817 |
| 2022/0269503 A1 | 8/2022 | Balasubramanian et al. |
| 2023/0297916 A1* | 9/2023 | Leung ............... G06Q 30/0185 |
| | | 705/7.28 |

FOREIGN PATENT DOCUMENTS

| | | |
|---|---|---|
| WO | 2015147878 A1 | 10/2015 |
| WO | 2021216161 A1 | 10/2021 |

* cited by examiner

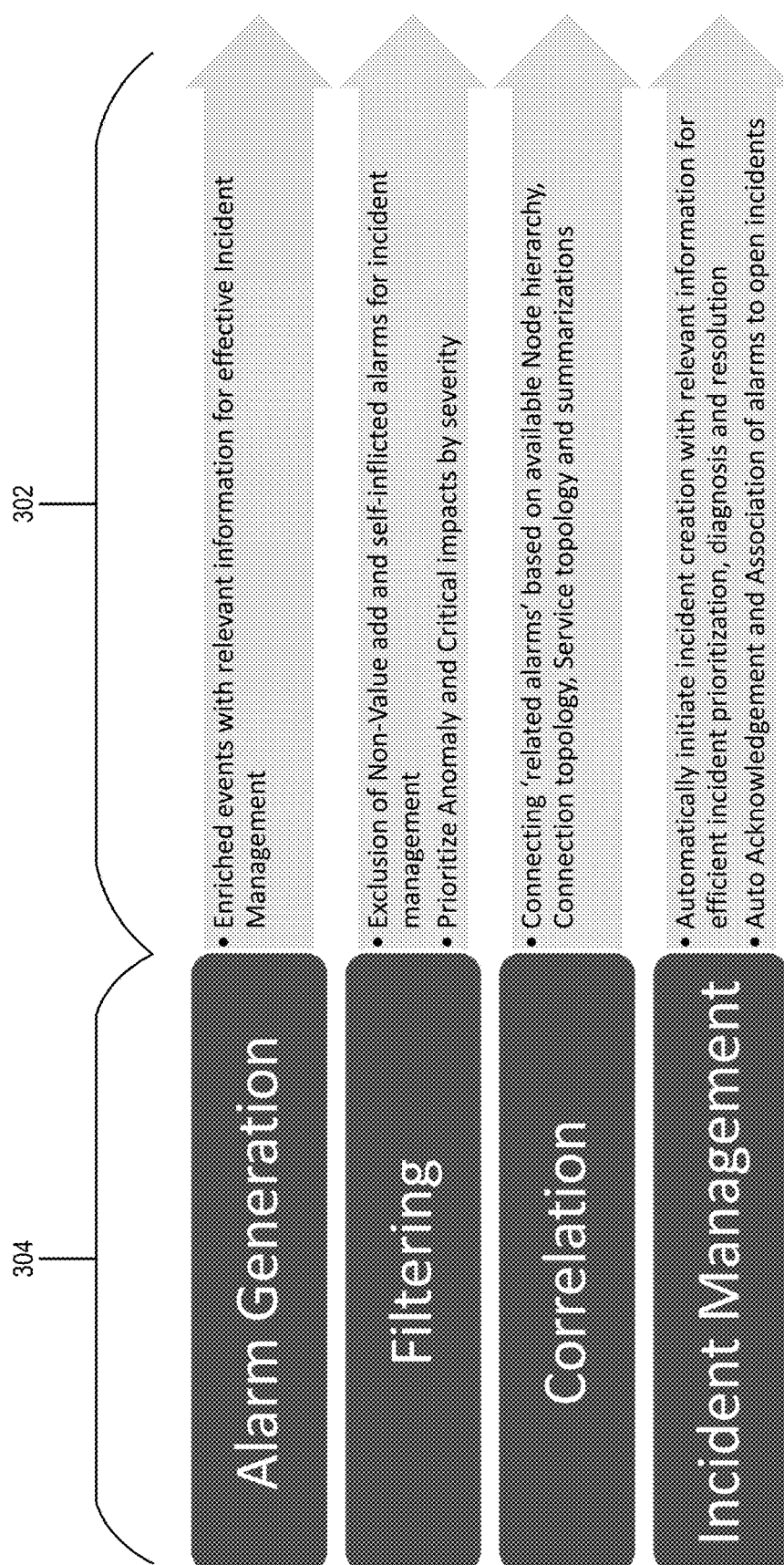

Alarm Generation
- Enriched events with relevant information for effective Incident Management

Filtering
- Exclusion of Non-Value add and self-inflicted alarms for incident management
- Prioritize Anomaly and Critical impacts by severity

Correlation
- Connecting 'related alarms' based on available Node hierarchy, Connection topology, Service topology and summarizations

Incident Management
- Automatically initiate incident creation with relevant information for efficient incident prioritization, diagnosis and resolution
- Auto Acknowledgement and Association of alarms to open incidents

Enable Event Management
- Add a node to the FM systems as part of CI Onboarding
- Enable & (if feasible) Validate alarming

Disable Event Management
- Remove a node from FM systems as part of CI Decommissioning
- Disable alarming

User Actions
- Create an incident
- Associate Alarm to open Ticket
- Acknowledge alarm
- Clear Alarm

302

304

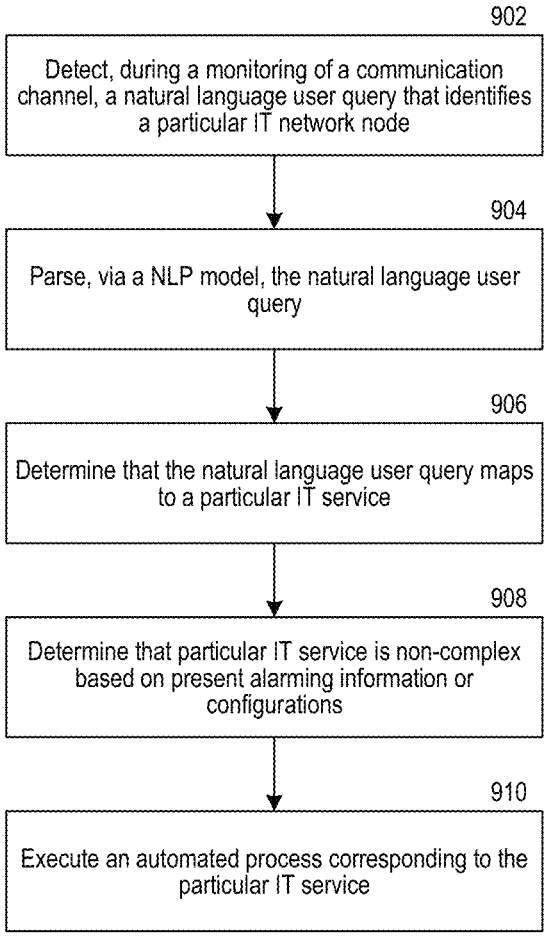

902

Detect, during a monitoring of a communication channel, a natural language user query that identifies a particular IT network node

904

Parse, via a NLP model, the natural language user query

906

Determine that the natural language user query maps to a particular IT service

908

Determine that particular IT service is non-complex based on present alarming information or configurations

910

Execute an automated process corresponding to the particular IT service

*FIG. 9*

NATURAL LANGUAGE PROCESSING (NLP)-BASED AUTOMATED PROCESSES FOR INFORMATION TECHNOLOGY SERVICE PLATFORMS

BACKGROUND

In an information technology (IT) environment, user requests and engagements for IT service management (ITSM) vary in complexity. For example, an IT user request can be a trivial question/clarification, a request for a routine task, or a complex engagement that needs significant work and intercommunication with other entities (such as subject matter experts), systems, and platforms. Manual processing of user requests is time-consuming, and as does prioritization and sorting of the user requests. IT user requests can go unanswered and unaddressed for long durations of time, leading to system-wide operational inefficiency.

BRIEF DESCRIPTION OF THE DRAWINGS

Detailed descriptions of implementations of the present system will be described and explained through the use of the accompanying drawings.

FIGS. 3A and 3B include examples of IT services to which an IT service platform maps user queries and that the IT service platform performs via execution of automated processes.

FIG. 9 is a flow diagram that illustrates example operations implemented by an IT service platform for preemptively detecting natural language user queries for IT services and executing automated processes for certain IT services.

Figure 1:
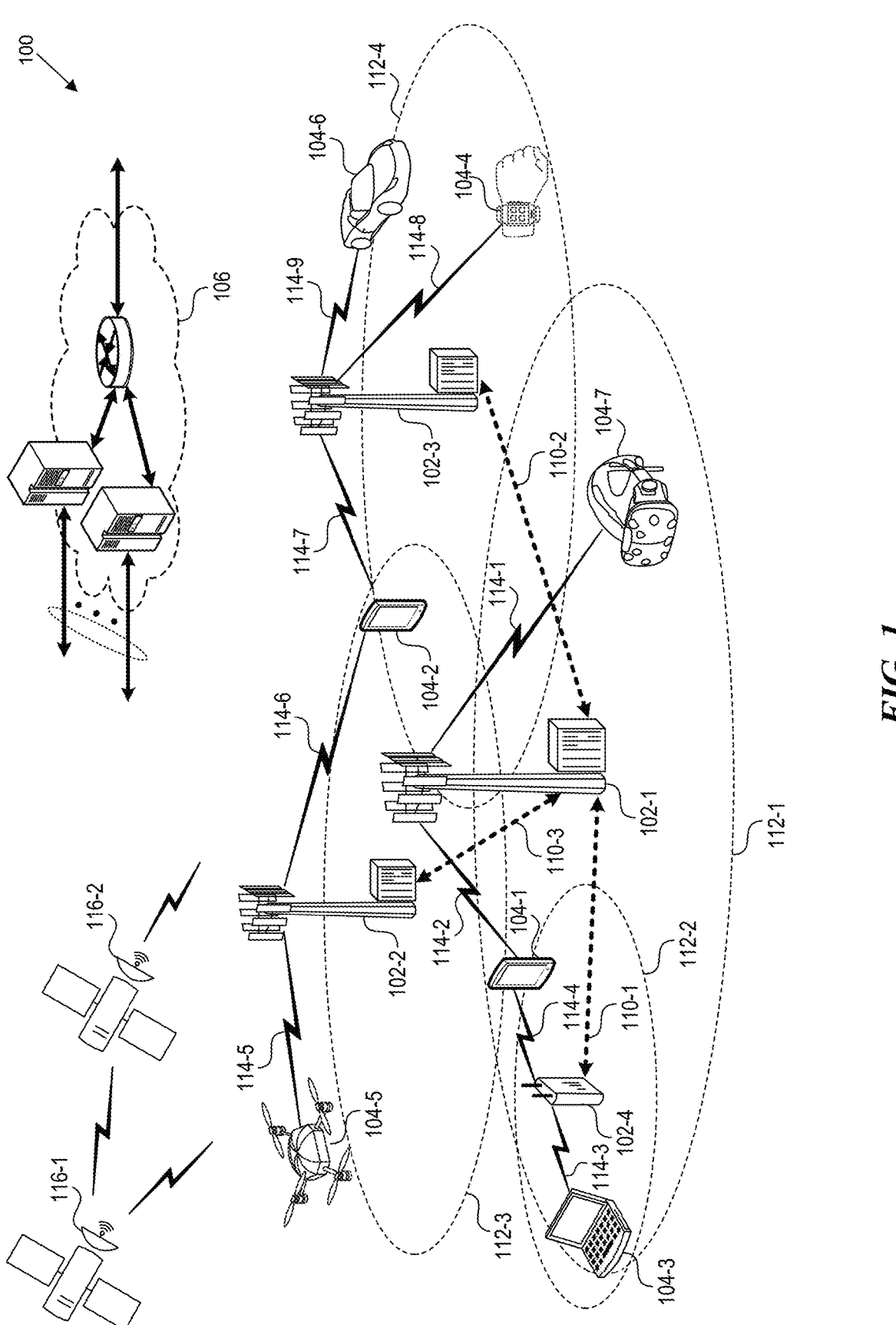
FIG. 1 is a block diagram that illustrates a wireless telecommunication network connected to example implementations of the present system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Aspects of the present system improve operational efficiency in ITSM and IT operation management (ITOM) in IT networks and environments by analyzing natural language user queries in communication channels and executing automated processes to perform IT services to which the natural language user queries are mapped. Mapping user queries to pre-defined IT services employs at least one natural language processing (NLP) model that extracts keywords and information from the user queries, and in some implementations, the user queries are detected via monitoring bots in communication channels. In some implementations, monitoring bots in communication channels can detect natural language user queries for IT requests and confirm user expectations, establish IT service parameters, and automatically create data records related to any automated actions to be executed in response to the detected natural language user query.

The present system can execute automated processes according to complexity levels of the mapped IT services. For example, the present system can automatically generate a data record (e.g., an intake record/ticket or a request ticket on a project management platform, such as Jira) to describe and flag a natural language user query for manual operation, if the natural language user queries are classified as complex. In some examples, the present system can provide instructions in a communication channel for the user to "self-service" and handle the request indicated in the user's own natural language user query. Conversely, the present system can automatically execute automated processes for IT services requested by other natural language user requests, if these natural language user requests are deemed as non-complex (e.g., according to present alarming configurations or states). Other examples of determining complexity of requested IT services can be implemented; for example, the present system can use a number of interdependencies and connections of a particular alarm in an IT infrastructure to estimate the complexity of service actions on the particular alarm.

Various examples of IT services described herein include services related to event/fault management and alarming, although it will be understood that other IT services can be implemented according to disclosed aspects of the technology, such as repair services, network services, diagnosis services, IT team assignment services, quarantining services, and/or the like. Event Management as a Service (EMaaS) presents alarms for significant events requiring action for restoration of services and to mitigate or proactively prevent service quality reductions. EMaaS involves alarming on network and service degradations to enable proactive or reactive incident resolutions.

Through various technical benefits such as those discussed herein, the present system can efficiently resolve multiple IT service requests and IT engagements. The disclosed system can proactively detect and preemptively address implicit user requests based on improved request detection via an NLP model. As a result, the disclosed system can initiate an IT service in less time that a user would normally spend simply to gather information to generate a data record and submit the data record to an IT service platform. The disclosed system improves operational capacity and other parameters of an IT service platform, such as average time to resolve requests, volume of event/ fault management alarms that can be provisioned for a given time period, amount of computing resources expended to resolve IT service requests, among others. Example implementations of the present system are also easily scalable. The present system can include new automated processes for new IT services as they are developed, and can update the system's catalog of pre-defined IT services.

In an example, a requestor could have a problem statement such as a broken network connection. The example IT service platform is configured to execute next steps to facilitate triage and resolution. Was it related to a planned event deployed? Was it a broken network connection or new connection provisioning that failed? Depending on the extent of impact, the example IT service platform can automatically connect, communicate with, and inform different IT users or teams to engage the IT users or teams to resolve the problem statement. Thus, an outcome of the IT service platform is to identify probable team for engagement with the right system of record created/referenced (Incident, Problem, Change). Events that can be automatically restored would trigger the right service catalog item (automation) for restoration of service. The example IT service platform can deflect calls and communications directed to IT users and teams using the disclosed automated Q&A approaches to facilitate simple tasks and/or direction to right engagements. Information management can be facilitated using an NLP intensive search of key terms to find best fit information. These may range from published articles, vendor documentation, process and procedure documents, incident worklogs, industry best practices, and more.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 in which aspects of the present system are incorporated. Operational and technical improvements to IT service platforms or platforms for ITSM can be connected to the wireless telecommunication network 100, for example, to communicate with client/user devices and/or with IT network nodes configured for event/fault management alarming. For example, an example IT service platform receives user queries for IT services via the wireless telecommunication network 100, monitors for user queries for IT services in communications between devices within the wireless telecommunication network 100, and executes automated processes to perform requested IT services that can involve modifications or provisioning of event/fault alarming for devices within the wireless telecommunication network 100. Further, in some examples, event/fault management and alarming capabilities of the IT service platform include monitoring connection status between IT network nodes, including connection statuses for connections via the wireless telecommunication network 100. Some of the devices and systems described in the context of the wireless telecommunication network 100 are IT network nodes that can be monitored via alarms managed by the example IT service platform.

Therefore, the example implementations disclosed herein can provide technical benefits for the wireless telecommunication network 100. In some examples, network traffic and cellular call traffic is reduced as a result of user issues being automatically resolved by the example IT service platform. For example, by way of the example IT service platform automatically performing certain IT services and communicating self-service instructions to requesting users, a fewer amount of users occupy bandwidth of the wireless telecommunication network 100 to call or otherwise communicate with IT users.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104" and also referred to herein as user equipment or UE) and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

Wireless devices 104 of the wireless telecommunication network 100 vary in type and capability. For example, the wireless devices 104 illustrated in FIG. 1 includes a head-mounted device (HMD) that is configured to execute XR services (104-7), a smart watch device (104-4), a mobile phone (104-1), and others. The wireless devices 104 each execute different services or applications and according to aspects of the present system, handover of the wireless devices 104 within the wireless telecommunication network 100 is specific to each wireless device 104 and the services or applications presently being executed at each wireless device 104.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links. In handover operations, communication links 114 can be created, redirected or modified, and/or terminated in order to provide UE mobility within the wireless telecommunication network 100.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Example Telecommunication Network Functions

Figure 2:
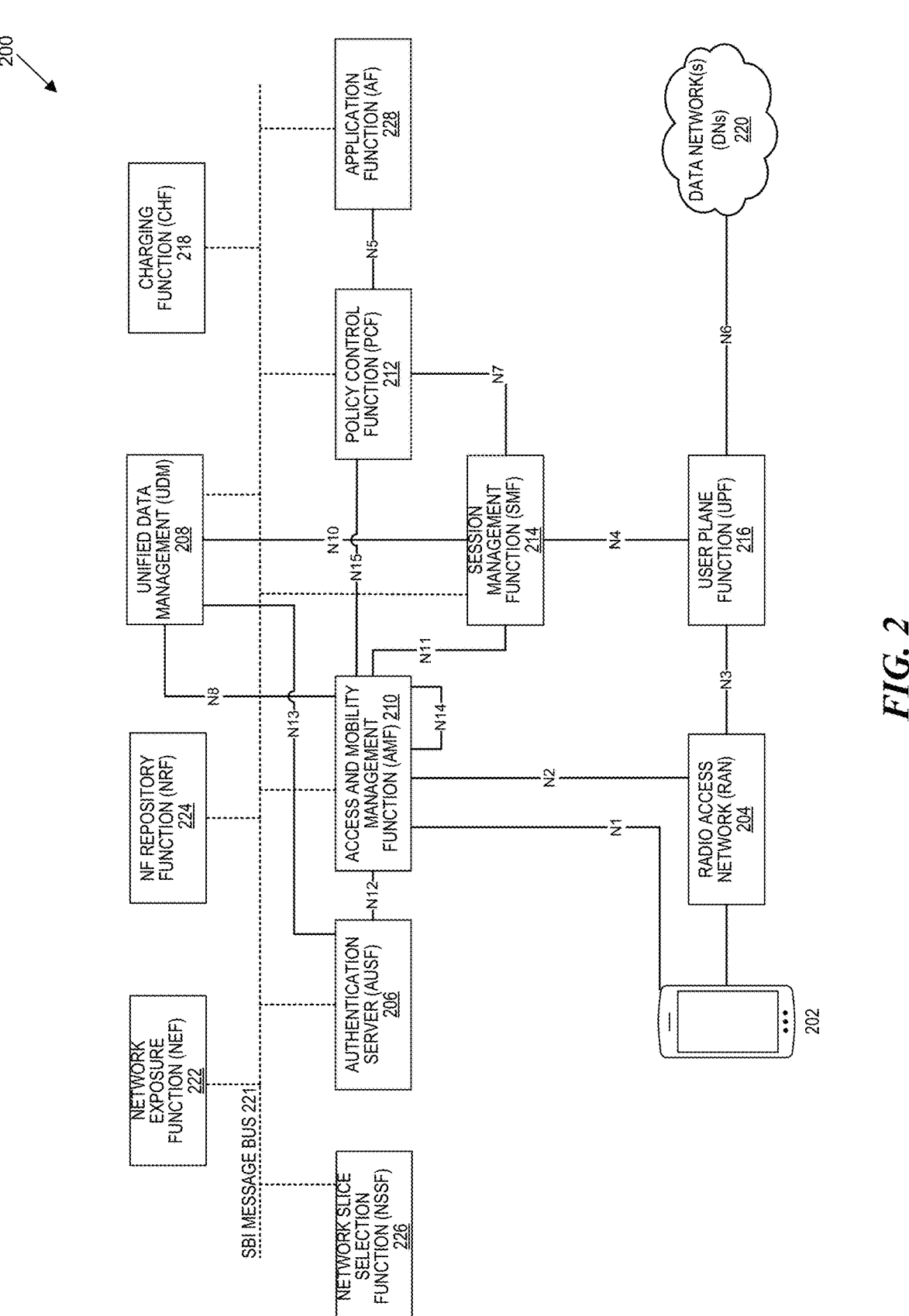
FIG. 2 is a block diagram that illustrates network functions (NFs) of a wireless telecommunication network related to aspects of the present system.

FIG. 2 is a block diagram that illustrates an architecture 200 including network functions (NFs) that are related to aspects of the present system. For example, the network functions in the illustrated example belong to a 5G core network. It will be appreciated that the present system is also applicable to network functions associated with a 4G LTE core network (e.g., Evolved Packet Core, or EPC), a 6G core network, and/or the like.

According to FIG. 2, a wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. In some implementations, one or more NFs of the core network perform example operations described herein to detect network-supported services being executed by a UE, provide event thresholds that correspond to network-supported services to UEs, and facilitate handover of UEs between network cells and/or nodes.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Implementations of IT Service Platforms

As discussed, example implementations of the present system detect natural language user queries pertaining to IT services and engagements, and execute automated actions based on complexity of the IT services and engagements identified in the natural language user queries. Disclosed implementations provide technical benefits with respect to at least operational efficiency, proactive fulfillment of user requests, and intelligent automation of non-complex IT services.

Figure 3B:
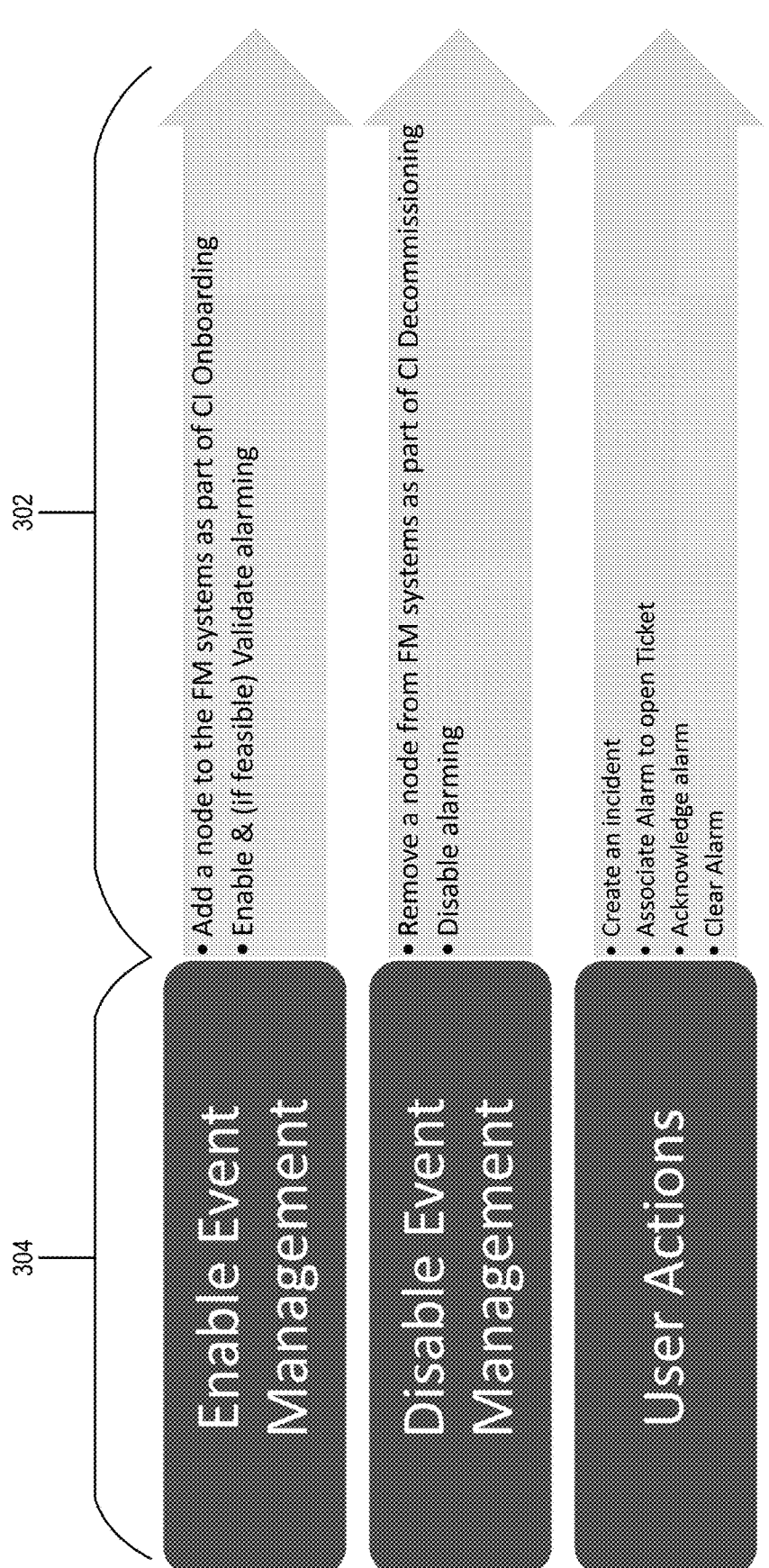

FIGS. 3A and 3B include examples of IT services 302 to which an IT service platform can map natural language user queries (including implicit queries) and that the IT service platform can perform via execution of automated processes. As illustrated, the IT services 302 provided by an IT service platform include services particularly related to event/fault management and alarming, where alarms for functionality, connectivity, and capability (and degradation thereof) can be provisioned/generated, modified, correlated, and decommissioned. In some implementations, each of the IT services 302 corresponds to an automated process that is pre-defined and pre-configured for execution by the IT service platform. For example, the corresponding automated process for an IT service is a script, a function, a software module, and/or the like.

As demonstrated in FIGS. 3A and 3B, various IT services can be categorized according to various types of IT services. For example, an IT service platform categorizes IT services under service categories 304, such as Alarm Generation, Filtering, Correlation, and others. In some implementations, categorization of IT services improves the mapping of natural language user queries, which may not explicitly designate or indicate a specific IT service in a pre-defined manner, to a particular IT service. For example, an IT service platform first determines a service category to which a user query pertains, and the IT service platform then attempts to map the user query to a particular IT service within the service category or requests additional parameters for the user query in a communication channel.

In some implementations, IT services belong to at least two categories that include a first category for automated resolution and a second category for self-service resolution. IT services categorized for automated resolution (e.g., IT services illustrated in FIG. 3A) are associated with automated processes that entirely fulfill the respective IT service. IT services categorized for self-service resolution (e.g., IT services illustrated in FIG. 3B) are associated with automated processes that provide instructions and processes to a requesting user for the requesting user to perform. In some implementations, an IT service can be categorized for automated resolution or for self-service resolution depending on a location, system, or platform to which the IT service relates or is associated. For example, if the IT service relates a particular system in communication with the IT service platform, the IT service platform categorizes the IT service for automated resolution, because the IT service platform is configured to automatically perform the IT service based on its connection with the particular system. Conversely, if the IT service relates to a particular system not in communication with the IT service platform or more accessible by a user device, the IT service platform is configured to categorize the IT service for self-service resolution.

Figure 4:
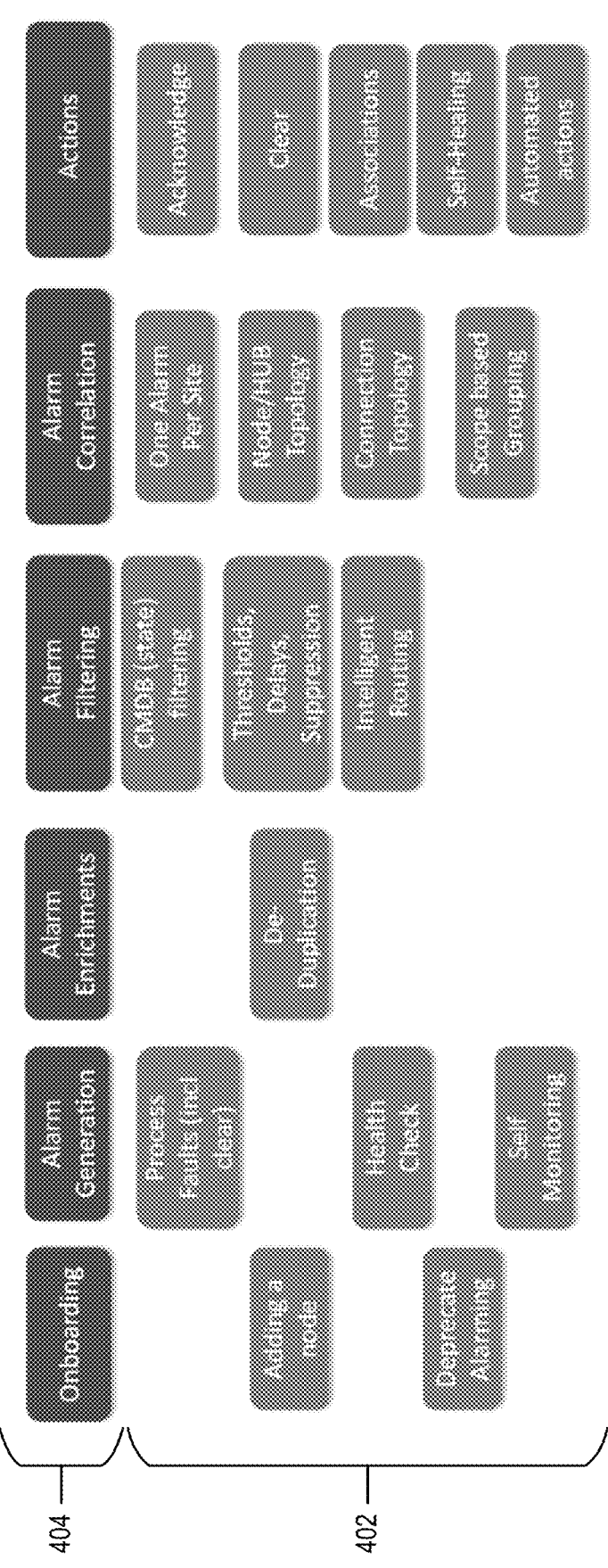
FIG. 4 includes examples of IT services and service categories for the IT service according to which an IT service platform maps user queries to IT services.

FIG. 4 provides another example implementation in which IT services 402 can be categorized or grouped into service categories 404. In some implementations, each service category 404 or group (e.g., "Onboarding," "Alarm Generation") corresponds to an automated process, and different specific IT services within the category can be selected during execution of the automated process based on certain input parameters. For example, subsequent to mapping a natural language user query to a particular service category and initiating an execution of a corresponding automated process, an IT service platform requests additional parameters via a communication channel pertaining to a selection of a particular IT service. Similarly, in some implementations, mapping of user queries to IT services by an IT service platform is an automated and hierarchical interaction within a communication channel with a requesting user. For example, subsequent to detecting a user query in a communication channel, the IT service platform iteratively presents service options of a first tier for selection by a user (e.g., the service categories 404), then service options of a second tier based on the selection by the user (e.g., the IT services 402), and so on.

Figure 5:
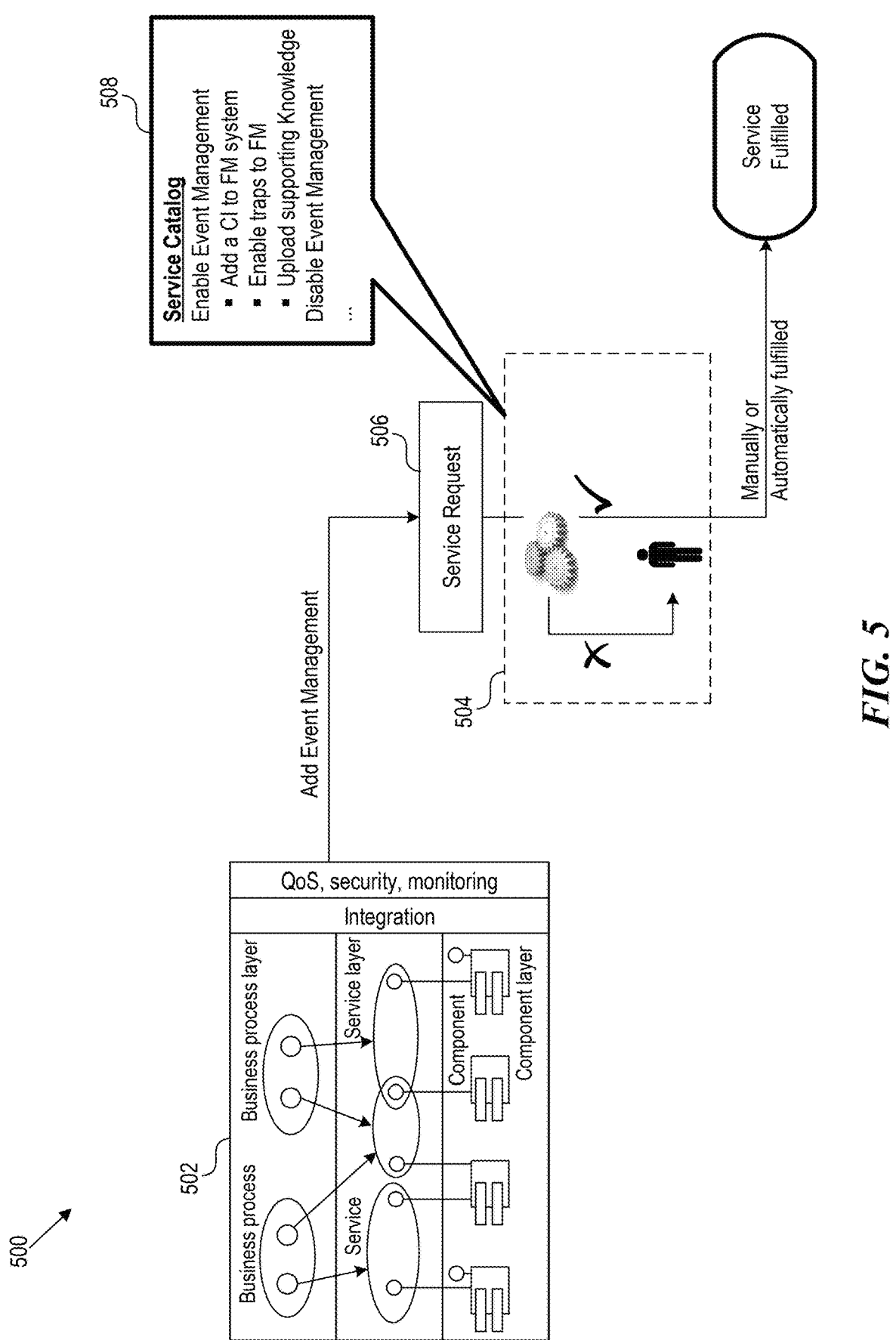
FIG. 5 is a block diagram that illustrates an example IT network or infrastructure in which an IT service platform implements aspects of the present system.

FIG. 5 is a diagram that illustrates an IT infrastructure 500 or network in which an IT service platform can be implemented to improve service request handling. The IT infrastructure 500 includes multiple configuration items (CIs) that represent hardware and software technology products used by users associated with the IT infrastructure 500. For example, the CIs of the IT infrastructure 500 include IT network nodes or hardware devices, such as printers, desktop computers, backend servers, mobile user devices, wireless network routers, and/or the like (e.g., various devices discussed with FIG. 1). The CIs of the IT infrastructure 500 can include communication networks themselves, including local area networks (LANs), telecommunication or cellular networks (e.g., 5G networks, wireless telecommunication network 100), and/or the like. The CIs of the IT infrastructure 500 can further include software applications and tools used by users in the IT infrastructure 500 or network.

In some implementations, the IT infrastructure 500 includes an infrastructure database 502, such as a configuration management database (CMDB) or an IT infrastructure library (ITIL) database, that stores information regarding the CIs belonging to the IT infrastructure 500. In some implementations, as illustrated in FIG. 5, the infrastructure database 502 organizes the CIs into logical layers and also stores information describing relationships and connections between CIs, for example, as a node topology or graph. In an example, the infrastructure database 502 includes a user interface layer that includes user interfaces, a service layer in which services are run/executed, and a service component layer in which functional and technical applications are saved. The infrastructure database 502 can be dynamically managed and updated to reflect current infrastructure information through changes such as CI decommission, CI deployment change, CI commission, new CI onboarding, and/or the like. The infrastructure database 502 is configured to provide information that enables various IT service such as network validation testing and device acceptance. In particular, the infrastructure database 502 stores relationship/connection information and/or layer information for CIs that is used for event/fault management alarming for the CIs.

As illustrated in FIG. 5, the IT infrastructure 500 includes an IT service platform 504 that implements the various techniques disclosed herein. In particular, the IT service platform 504 is configured to provide IT services, including services related to event/fault management and alarming, for the IT infrastructure 500. According to example implementations of the present system, the IT service platform 504 preemptively detects natural language user queries in communication channels and automatically executes certain IT services indicated by the detected user queries.

For example, the IT service platform 504 receives or detects a service request 506 related to IT services for the IT infrastructure 500. The IT service platform 504 is configured with (e.g., stores) a service catalog 508 that includes predefined IT services that can be automatically performed by the IT service platform 504. The IT service platform 504 maps, attributes, or matches the service request 506 to a particular pre-defined service of the service catalog 508 and determines whether the particular pre-defined service should be manually or automatically fulfilled. The IT service platform 504 makes the determination concerning manual or automatic fulfillment of the particular pre-defined service based on a complexity of the particular pre-defined service and current states and configurations of the IT infrastructure 500 and alarms therein. Then, through manual or automatic fulfillment of the particular pre-defined service, the service request 506 is handled or completed.

Figure 6:
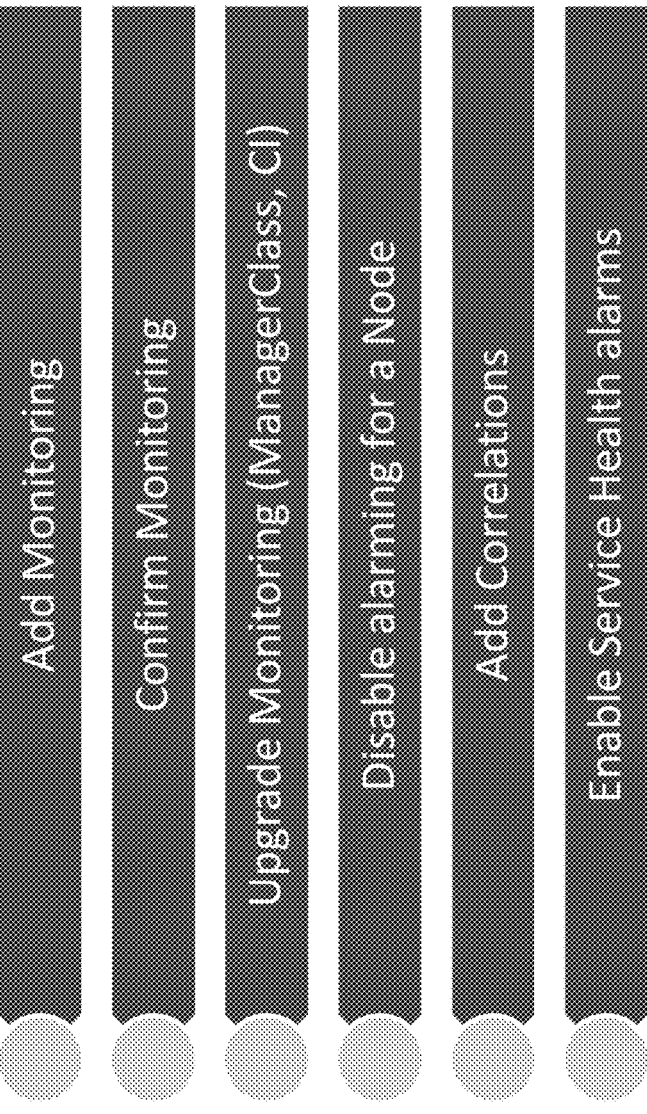
FIG. 6 includes an example catalog of pre-defined IT services that is used by an IT service platform that implements aspects of the present system.

FIG. 6 illustrates an example of the service catalog 508 used by an IT service platform. The illustrated example of the service catalog 508 includes six different IT services. In some implementations, certain services of the service catalog 508 are indicated for manual fulfillment due to inherent complexities of the certain services. For example, adding correlations between alarms can require complex rule changes and is indicated for manual fulfillment. In some implementations, the IT service platform publishes the service catalog 508, such that users that make service requests 506 can include a selection of a particular service from the service catalog 508.

Figure 7A:
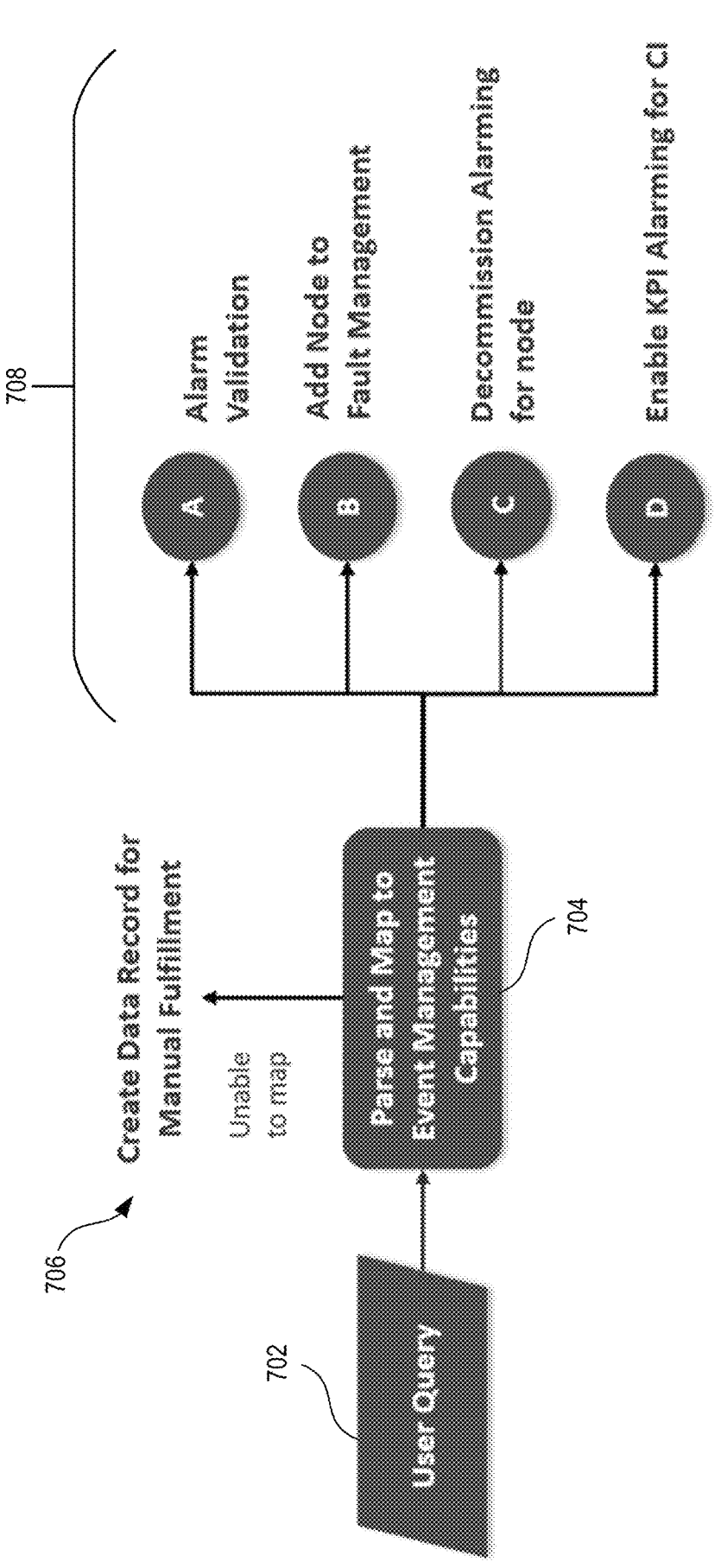
FIGS. 7A-7C are flow diagrams that illustrate example operations performed by an IT service platform to automatically fulfill and handle user requests for IT services.
Figure 7B:
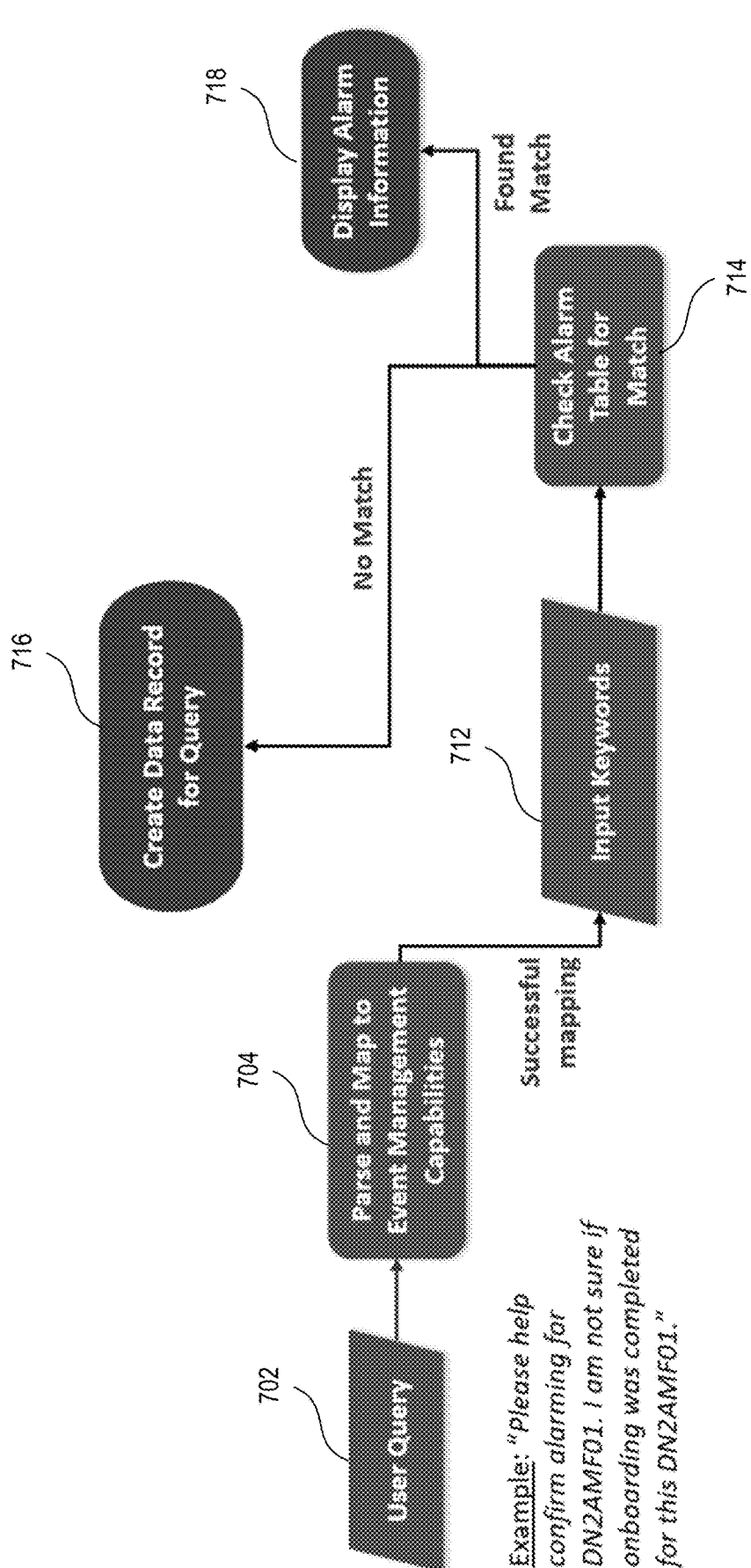
Figure 7C:
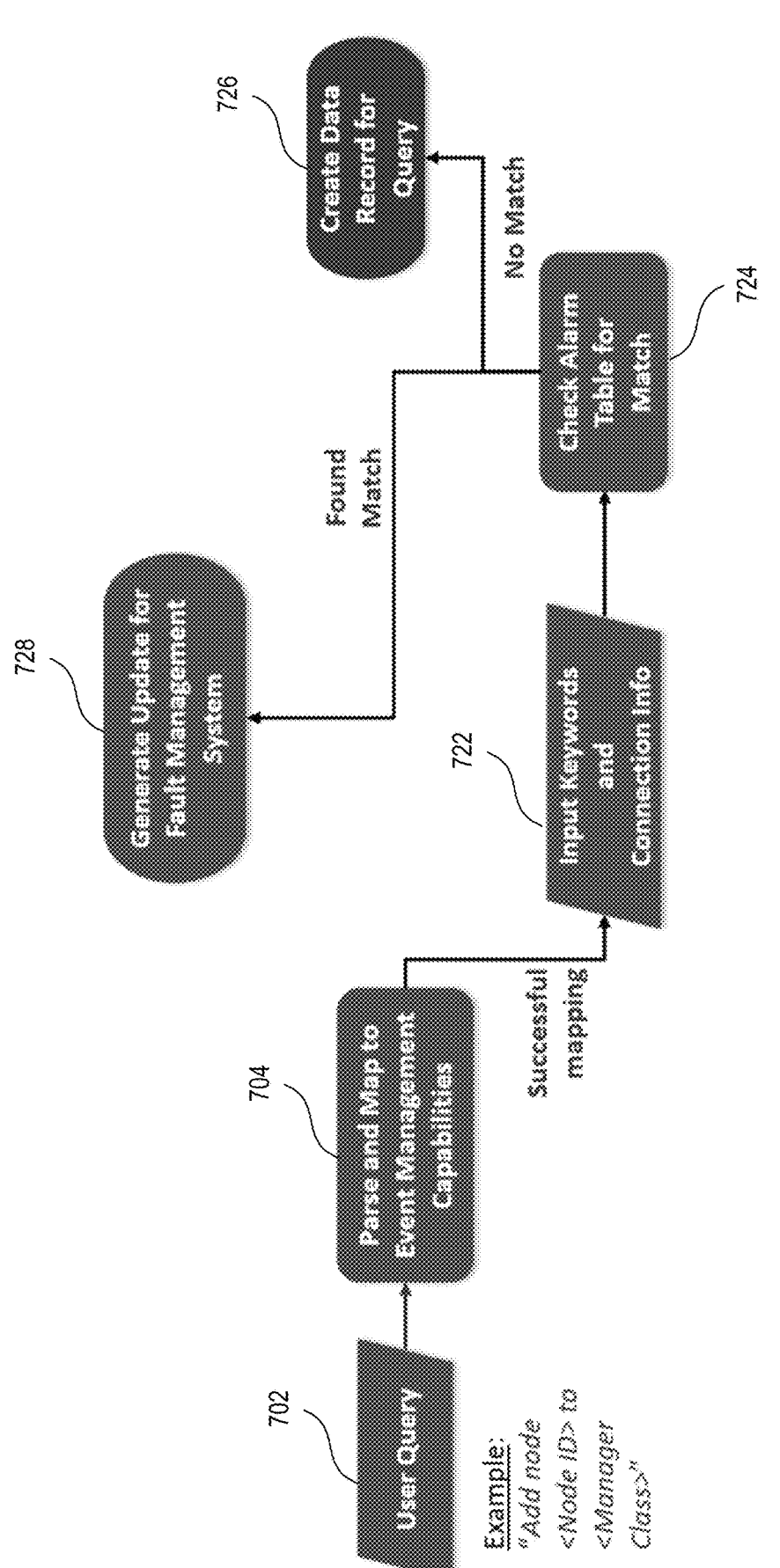

FIGS. 7A-7C are flow diagrams that illustrate example operations performed by an IT service platform to automatically fulfill and handle user requests for IT services. Referring first to FIG. 7A, a user query is detected at 702. The user query expresses a request or engagement related to IT services for an IT infrastructure, and the user query may be automatically detected in a communication channel. For example, the user query is a natural language utterance in phone call, video meeting/conference, a voice recording, and/or another audio-based communication platform. In such examples, the natural language utterance is transcribed to a text form or a text-based representation. As another example, the user query is a text-based message or string in a messaging platform, messaging channel, e-mail message, text message, and/or the like. The user query is detected based on monitoring of the communication channel. For example, the user query is a text-based message in a communication or collaboration platform (e.g., a Slack collaboration and messaging platform), which includes bots that are configured to automatically detect and report occurrences of IT-related user queries (e.g., based on keywords, based on detected semantic or underlying meaning). In some implementations, the natural language user query is not directed or addressed to the IT service platform. For example, an employee converses with another employee over a messaging platform and expresses a need for an IT service, and the expressed need is automatically detected according to monitoring functionality of the messaging platform. In some implementations, automated confirmations and prompts for further information and parameters can be provided in the communication channel. Such further information can include external descriptions (e.g., an Hypertext Transport Protocol (HTTP) link to an external platform), data object models or classes, time windows or timelines, and/or the like.

At 704, the user query is parsed using an NLP model to extract meaning and information from the user query, and the user query is mapped to event management capabilities of the IT service platform, or in particular, to services of the service catalog of the IT service platform. In some implementations, the NLP model is also used to detect the user query. For example, the NLP model is configured and trained to detect service request phrases or keywords (e.g., "confirm," "alarming") included in user queries. In some implementations, the NLP model employs NLP techniques like Word to Vector. word2vec is a family of model architectures and optimizations that can be used to learn word embeddings from large datasets. Embeddings learned through word2vec have proven to be successful on a variety of downstream natural language processing tasks. The word embeddings inform the meaning and information of the natural language in the user query, and the NLP model (or another model, such as a classification model or a deep learning model) is configured to map the word embeddings to pre-defined IT services. In some implementations, the NLP model is configured and trained for sentiment analysis in order to provide optimal responses and automations. Via the sentiment analysis, the NLP model can estimate an urgency and time window associated with the user query and the requested service and use the estimation to prioritize the user query. In some embodiments, the NLP model includes Spark NLP, which serves as an efficient framework for processing a large amount of text. In some implementations, the NLP model includes a transcription model that is configured to generate text transcriptions of natural language utterances that include user requests for IT services.

If the user query cannot be mapped to any service of the service catalog, then a data record is created at 706. In some implementations, the data record includes the user query and is flagged for manual fulfillment. That is, because the user query cannot be mapped to a pre-defined service, the user query is considered to be complex, warranting manual attention and fulfillment. Otherwise, at 708, automated processes for the service mapped to the user query are automatically executed for fulfillment of the user query.

In some implementations, the IT service platform automatically generates a data record that describe a completion of the automated process, subsequent to executing the automated process. The data record (or a link thereto) can be provided in the same communication channel in which the user query was detected, and thus indicates to the requesting user that the request was fulfilled. In some implementations, the data record includes a message indicating completion, a system of record used to provide the automated capability, a proof of value delivery (e.g., downloadable alarm list to confirm recent alarming or a link to published article), a quick engagement satisfaction rating (e.g., survey/feedback options in context of the specific engagement), and/or the like. In some implementations, the data record includes a fillable data field that enables a user to input an indication of whether the natural language user query is resolved or not. In some implementations, the automated processes performed by the IT service platform and/or the NLP model are reconfigured and retrained according to this feedback provided by users for historical queries and engagements.

FIGS. 7B and 7C illustrate example operations continuing through a successful mapping of the user query to a particular service. In the illustrated example of FIG. 7B, the user query conveys a request to validate or confirm an existing alarm. After mapping the user query to the Alarm Validation service (service "A" in FIG. 7A), requisite parameters for executing the Alarm Validation are obtained at 712. For example, an identifier for the existing alarm to validate is obtained. The requisite parameters can be obtained based on the parsing of the user query (at 704), based on subsequent communications or prompts that follow up on the user query, based on information extracted via the NLP model, and/or the like. At 714, current or present alarming information is referenced to determine the complexity of the user query or the mapped service. In the Alarm Validation service example of FIG. 7B, the alarming information is used to determine whether the indicated alarm exists (rendering the query as non-complex) or does not exist (rendering the query as complex). In some examples, complexity can be based on an amount of interconnections and dependencies associated with a target node or alarm. In some implementations, the alarming information can include alarm data tables, an alarm topology, and/or the like.

Figure 7D:
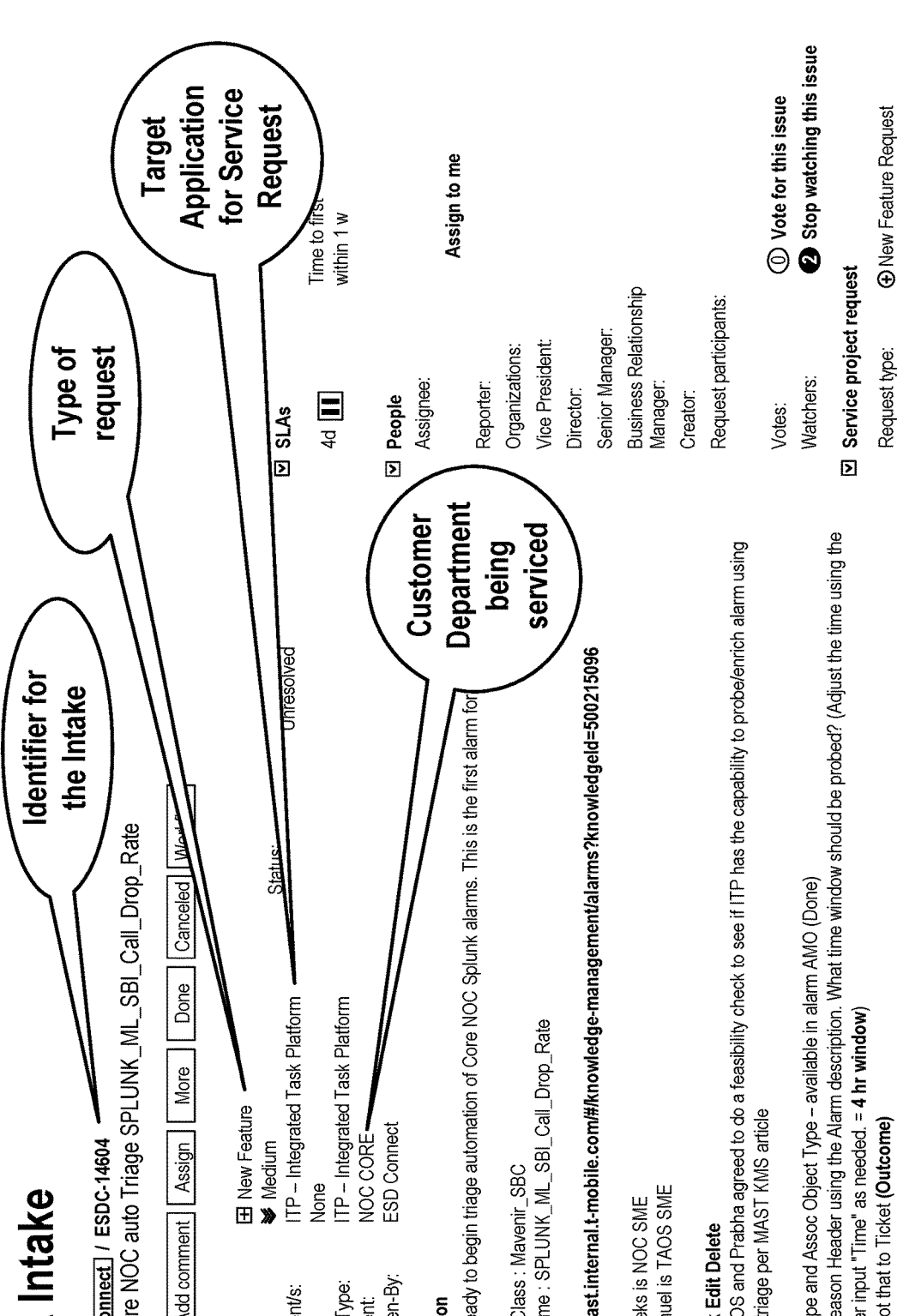
FIG. 7D illustrates an example data record that is automatically generated in response to a user query for an IT service request.

Based on a determined complexity of the query based on present alarming information, a manual fulfillment data record can be automatically generated for the query (at 716) or the service can be performed (at 718). For example, based on the indicated alarm existing in the present alarming information, the service is performed to display the requested information pertaining to the indicated alarm. FIG. 7D illustrates an example data record that is automatically generated in response to a user query for an IT service request. In some implementations, the data record is automatically generated and added to a collaboration platform, a record platform, a record database, and/or the like in which a team of IT service users can access the data record and use the information included in the data record to manually fulfill the requested IT service.

Returning to FIG. 7C, the user query conveys a request to add an alarming node, corresponding to service "B" in FIG. 7A. Similar to the illustrated example in FIG. 7B, input parameters are obtained at 722, and present alarming information is referenced at 724 to determine complexity of the request. If the service is non-complex and can be performed, then the service is performed at 728 or recorded for manual fulfillment at 726.

In some implementations, the IT service platform automatically connects an IT user to the communication channel in which the natural language user request was detected, as part of the fulfillment of the natural language user request. For example, the IT service platform automatically connects the IT user to a Slack messaging channel in which the natural language user request was posted, to a cellular call session in which the natural language user request was uttered, to an e-mail thread in which the natural language user request was entered. The IT user may be a subject matter expert, a member of the IT service team in an organization, an owner of the IT network node or CI that is the subject of the request, and/or the like. By automatically connecting the relevant entities to the communication channel in which IT services were requested, fulfillment of requests can be accelerated. For example, the IT user can communicate instructions to requesting users for the requesting users to handle their own IT service requests.

Figure 7E:
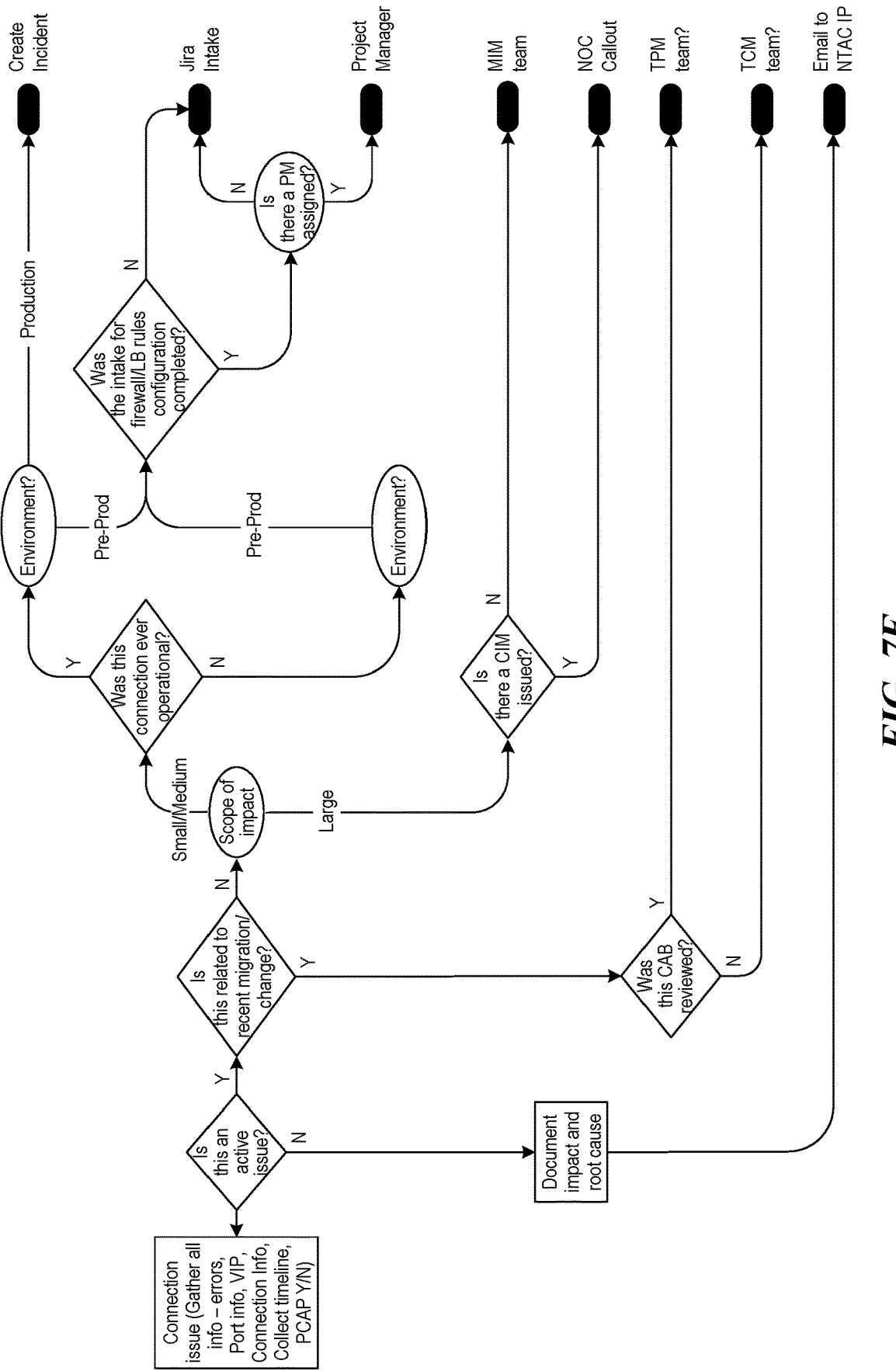
FIG. 7E is a flow diagram that illustrates multiple complexity determinations for automatically and/or manually fulfilling user requests for IT services.

FIG. 7E is a flow diagram that illustrates example operations for automatically and/or manually fulfilling IT service requests based on multiple complexity determinations. In FIG. 7E, a user query related to a connection issue is evaluated relative to recent IT migrations/changes, a history of the connection, and more. Based on these determinations, an IT service for the user query can be automatically fulfilled, automatically assigned to certain IT service users or teams for manual fulfillment, described and indicated in an automatically generated data record, and/or the like. Further, user query can be escalated or allocated among IT service users/managers/teams with different experience levels for resolving various IT-related failures or issues based on the example determinations shown in FIG. 7E. According to the flow illustrated in FIG. 7E, IT-related failures and issues can be triaged and resolved by the right IT service users and can be accompanied by required data records (e.g., automatically generated data records based on NLP-based parsing of user queries).

Figure 8A:
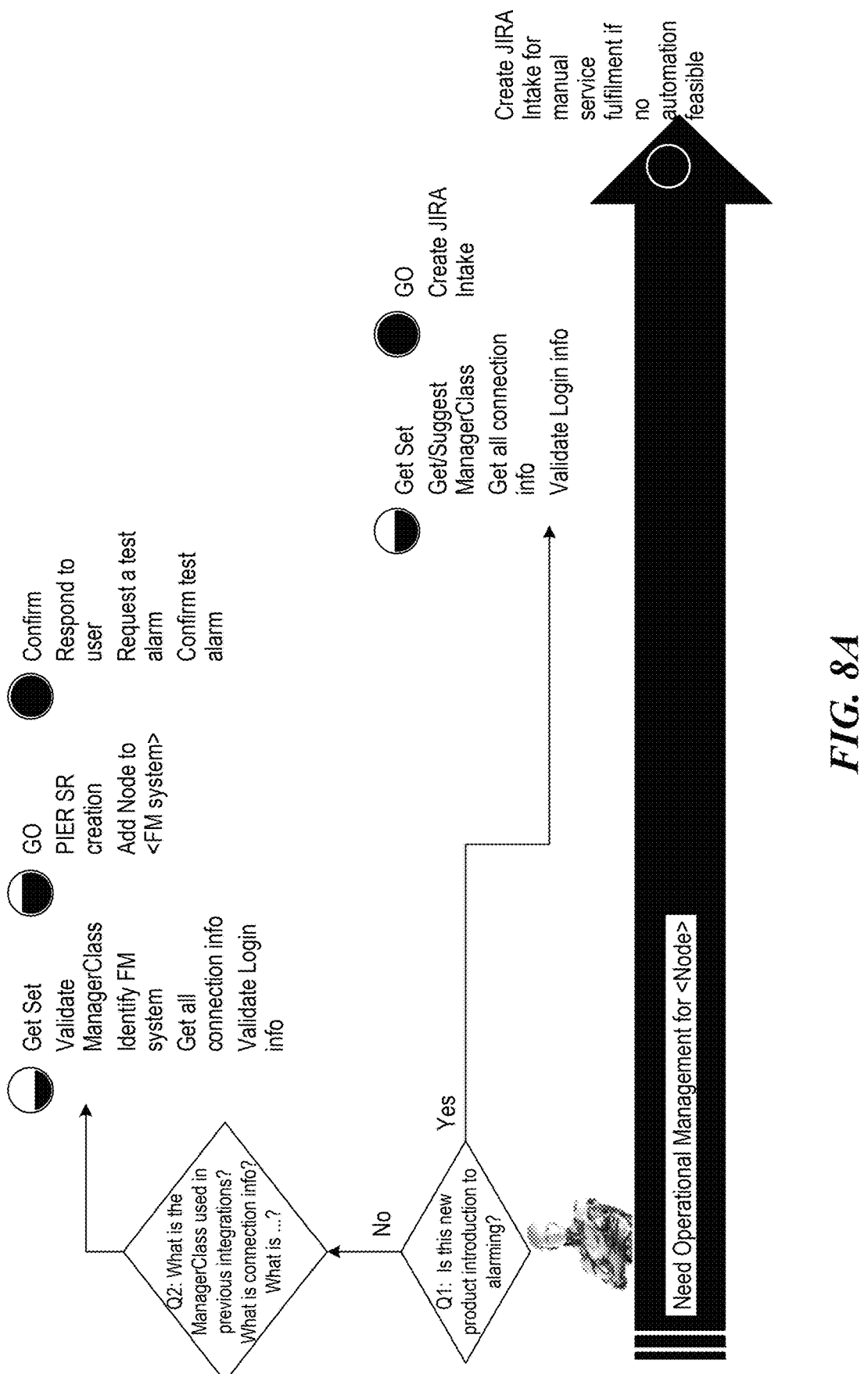
FIGS. 8A-8C are flow diagrams that illustrate example operations for automated processes executed by an IT service platform to perform IT services requested by users.
Figure 8B:
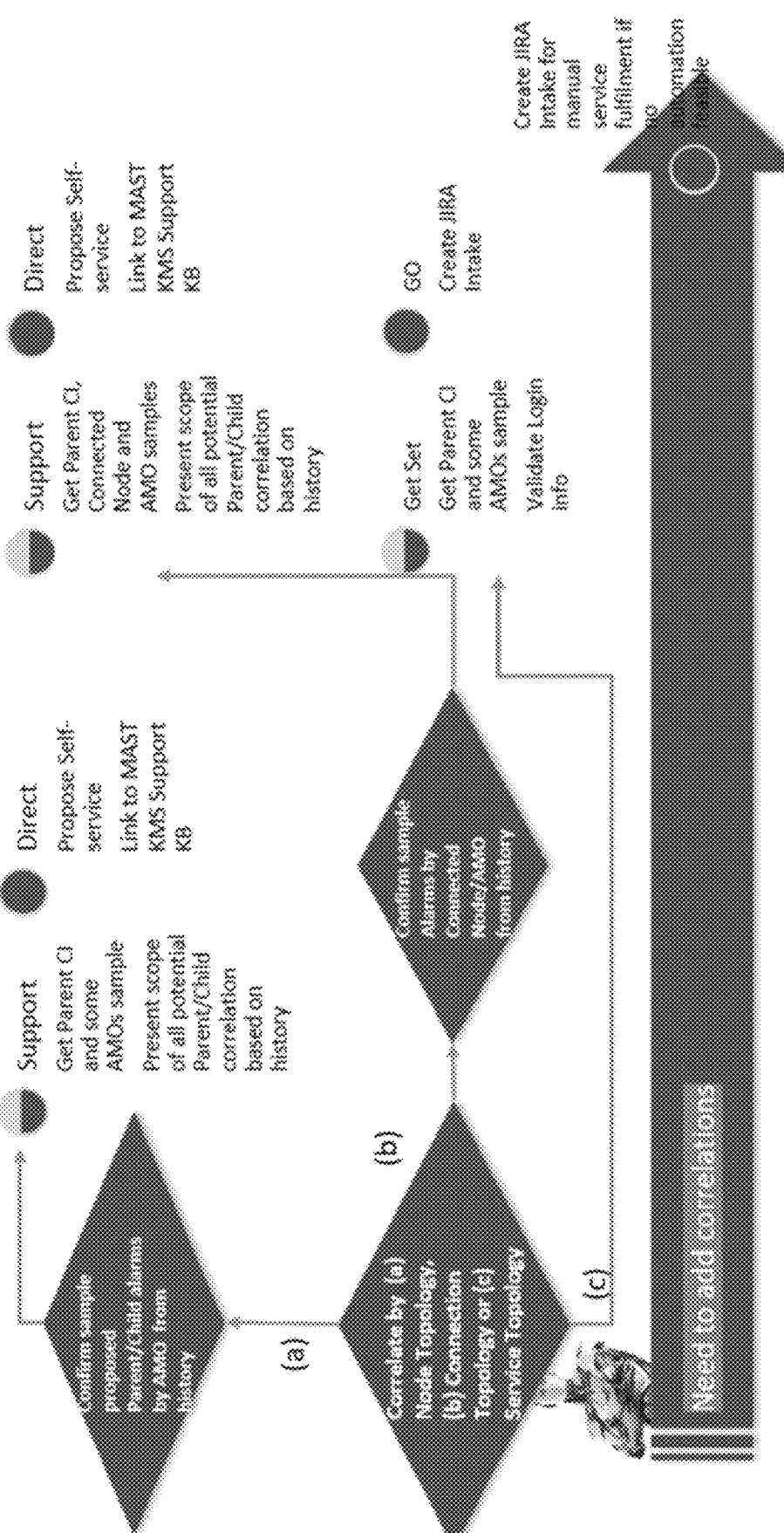
Figure 8C:
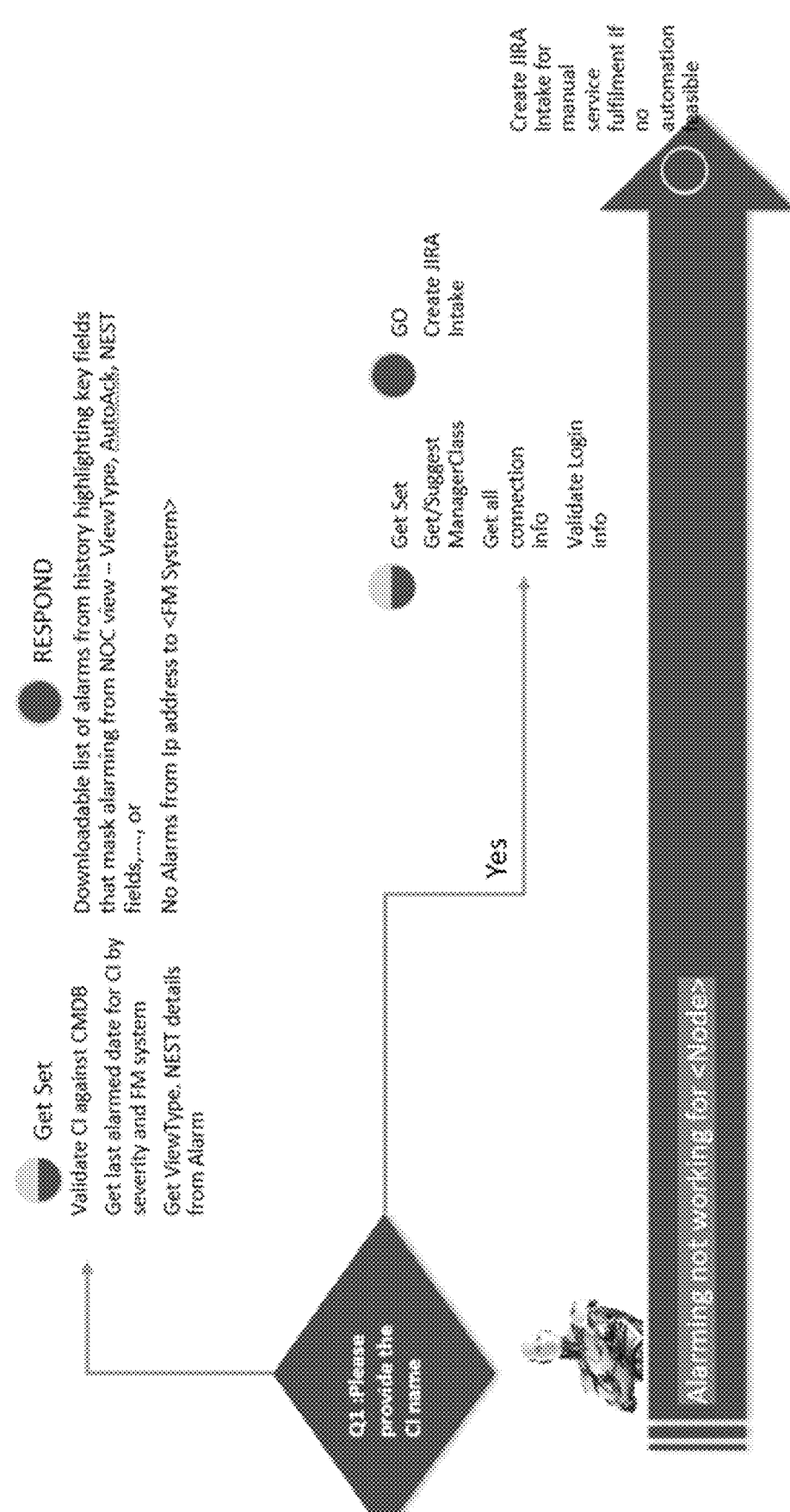

FIGS. 8A-8C are flow diagrams that illustrate example operations for automated processes executed by an IT service platform to perform IT services requested by users. FIG. 8A shows an automated process that, when executed, provides operational management for an IT network node or a CI in an IT infrastructure. The example automated process can fully add the IT network node to a monitoring system and test alarming functionality of the IT network node. FIG. 8B shows another automated process that adds correlations between alarms that monitor the IT infrastructure. The example automated process in FIG. 8B can provide information, resources, and references to the user for the user to easily add the correlation themselves, thus conserving resources on the ITSM/ITOM side that would be otherwise expended to manually add the correlation. Thus, in some examples, an automated process for a particular IT service involves providing instructions and links to a user for the user to perform the particular IT service themself. FIG. 8C shows another automated process that provides information related to alarming errors at a specified IT network node or CI. That is, the automated process in FIG. 8C involves retrieval of specific alarming information and causing display of the specific alarming information to the requesting user.

In some implementations, automated processes for IT services are implemented within communication channels or platforms. For example, a Slack collaboration and messaging platform includes bots or automations that can operate within a messaging channel, and an example bot or automation can implement one or more automated processes for IT services. An example bot or automation within a communication channel or platform can be configured to communicate with one or more external platforms, systems, or databases, such as an infrastructure database, an alarming platform, and/or the like in order to perform the automated processes. The example bot or automation can, depending on the example, complete backend operations to enact changes on fault/event management in the IT network (e.g., as in FIG. 8A), provide relevant information and instruction for performing the requested service (e.g., as in FIG. 8B), display requested information and data (e.g., as in FIG. 8C), and other functionality related to performing IT services.

FIG. 9 illustrates a flow diagram that includes example operations for preemptively detecting natural language user queries for IT services and automatically executing automated processes for certain IT services. In some implementations, the example operations are performed by an IT service platform in an IT network or environment, such as the IT service platform 504 described with FIG. 5.

At 902, the system detects a natural language user query during a monitoring of a communication channel. The natural language user query identifies at least one of multiple IT network nodes and/or references a particular IT service for the multiple IT network nodes, and in some implementations, the natural language user query is an implicit request.

At 904, the system parses the natural language user query using an NLP model. In some implementations, the NLP model is configured to extract keywords from the natural language user query and determine similarities of the keywords to keywords associated with specific IT services. In some implementations, the NLP model implements the Gensim text parser library to extract the underlying meaning of words in the natural language user query. In some implementations, the NLP model uses word2vec functions and techniques to compare extracted keywords with the keywords associated with specific IT services.

At 906, the system determines that the natural language user query maps to a particular IT service based on the parsing via the NLP model. The particular IT service can be one of a catalog of pre-defined IT services.

At 908, the system determines that the particular IT service is non-complex based on present alarming information or configurations. In particular, the system determines that the particular IT service can be automatically performed based on successfully obtaining input parameters and identifying relevant alarming information (e.g., relationship and connection information between CIs and between alarms).

At 910, the system executes an automated process corresponding to the particular IT service. In some implementations, the system execute the automated process based on providing input parameters extracted from the natural language user query and/or subsequent communications in the communication channel to the automated process.

In some embodiments, the system further generates a data record that confirms that the automated process is executed. In some implementations, the system provides an indication that the automated process is executed (e.g., a link to the generated data record) in the communication channel in which the user query was detected.

Alternatively, the system can determine that the particular IT service is complex and accordingly generate a data record indicating the particular IT service for manual fulfillment. For example, input parameters extracted from the query are inconsistent with current alarming information. As another example, the particular IT service is pre-configured as inherently complex.

Example Computer Systems

Figure 10:
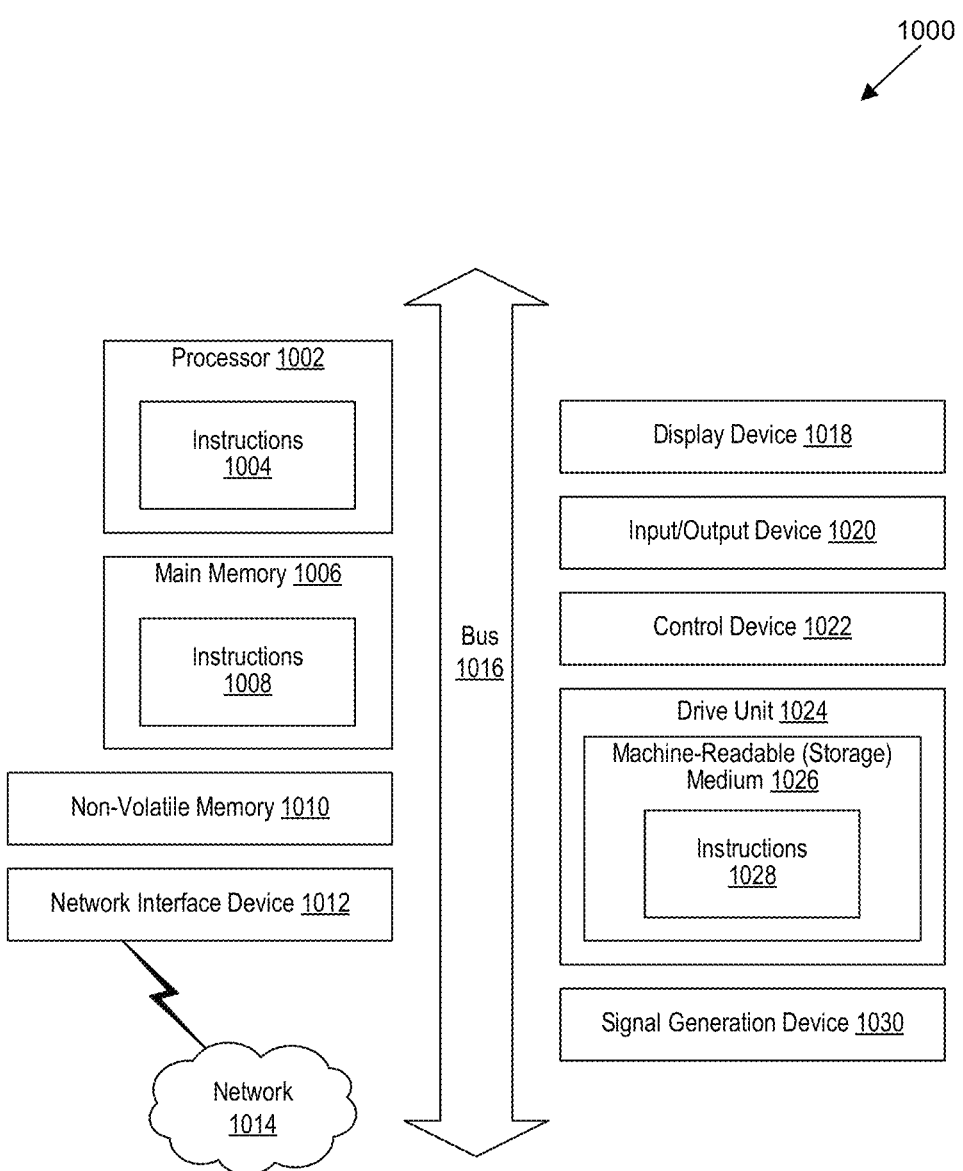
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computer system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1000. In some implementation, the computer system 1000 can be an embedded computer system, a system-on-chip (SOC), a single-board computer system (SBC) or a distributed system such as a mesh of computer systems or include one or more cloud components in one or more networks. Where appropriate, one or more computer systems 1000 can perform operations in real-time, near real-time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/ or associated caches and servers) that store one or more sets of instructions 1028. The machine-readable (storage) medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the present system. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the present system, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the present system should not be taken to imply that the terminology is being redefined herein to be restricted to any specific characteristics, features, or aspects of the present system with which that terminology is associated. In general, the terms used in the following claims should not be construed to limit the present system to the specific examples disclosed herein, unless the above Detailed Description explicitly defines such terms. Accordingly, the actual scope of the present system encompasses not only the disclosed examples, but also all equivalent ways of practicing or implementing the present system under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the present system can be modified to employ the systems, functions, and concepts of the various references described above to provide yet further implementations of the present system.

To reduce the number of claims, certain implementations are presented below in certain claim forms, but the applicant contemplates various aspects of the present system in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. An information technology (IT) service platform for detection and automated correction of technical problems in a telecommunication network, the IT service platform comprising:

at least one computer processor;

one or more non-transitory, computer-readable storage media storing instructions executable by the computer processor;

an alarming module configured to maintain alarming information related to fault management alarms for multiple network nodes in the telecommunication network, wherein the alarming information includes an alarm connection topology that describes dependencies and connections between different fault management alarms;

a channel-monitoring module configured to monitor multiple communication channels for natural language user requests, wherein the natural language user requests identify at least one of the multiple network nodes;

a request-mapping module configured to:
  store a catalog of pre-defined IT services related to the fault management alarms for the multiple network nodes,
    wherein the pre-defined IT services correspond to automated processes that are executable for performing the pre-defined IT services,
  parse, via a natural language processing (NLP) model, a particular natural language user request detected by the channel-monitoring module to determine whether the particular natural language user request is mappable to a particular pre-defined IT service in the catalog of pre-defined IT services, and
  in response to determining that the particular natural language user request is mappable to the particular pre-defined IT service, determine a complexity level for the particular natural language user request based on whether current alarming information maintained by the alarming module is consistent with the particular pre-defined IT service,
    wherein determining the complexity level comprises comparing parameters extracted from the particular natural language user request with current states of the fault management alarms in the alarm connection topology; and
  an execution module configured to, according to the complexity level, execute a particular automated process corresponding to the particular pre-defined IT service or generate a data record that flags the particular pre-defined IT service to a manual IT user.

2. The IT service platform of claim 1, wherein the request-mapping module is further configured to publish the catalog of pre-defined IT services to at least one of the multiple communication channels, and wherein the catalog of pre-defined IT services includes at least one of a first service for adding an alarm to a given network node, a second service for disabling an alarm for the given network node, or a third service for defining a connection between two alarms of the fault management alarms.

3. The IT service platform of claim 1, wherein the multiple communication channels includes at least one of a text-based messaging platform or an audio-based voice platform, and wherein the execution module is further configured to automatically connect an IT user associated with the identified network node or with the particular automated process to the text-based messaging platform or the audio-based voice platform in response to detecting the particular natural language user request.

4. The IT service platform of claim 1, wherein the alarming module includes an IT infrastructure library (ITIL) database that organizes components of the multiple network nodes into multiple logical layers, and wherein the multiple logical layers includes a user interface layer, a service layer, and a service component layer.

5. The IT service platform of claim 1, wherein the channel-monitoring module is further configured to provide a user message in a particular communication channel in which the particular natural language user request was detected, and wherein the user message confirms the particular pre-defined IT service mapped to the particular natural language user request, or reports an execution of the particular automated process.

6. The IT service platform of claim 1, wherein at least two of the multiple network nodes are connected via a 5G wireless network, and wherein at least one of the fault management alarms corresponds to a connection status between the at least two network nodes via the 5G wireless network.

7. A method comprising:
  detecting a natural language user request during a monitoring of a communication channel,
    wherein the natural language user request references at least one of multiple IT network nodes that are configured for fault management alarming;
  parsing, via a natural language processing (NLP) model, the natural language user request to determine whether the natural language user request is mappable to at least one of a catalog of pre-defined IT services related to the fault management alarming of the multiple IT network nodes;
  based on determining that the natural language user request is mappable to a particular pre-defined IT service, determining a complexity level of the natural language user request based on whether a present alarming state of the multiple IT network nodes is consistent with the particular pre-defined IT service,
    wherein determining the complexity level comprises comparing parameters extracted from the natural language user request with current states of fault management alarms associated with the multiple IT network nodes; and
  executing, according to the complexity level, an automated process associated with the particular pre-defined IT service to perform the particular pre-defined IT service.

8. The method of claim 7, further comprising:
  detecting a second language user request during the monitoring of the communication channel; and
  according to a complexity level determined for the second language user request based on the present alarming state being inconsistent with the second language user request, automatically generate a data record that is flagged for manual inspection.

9. The method of claim 7, wherein the communication channel is a text-based messaging platform, wherein the monitoring is performed by an application bot belonging to the text-based messaging platform, and wherein the method further comprises:
  automatically connecting an IT user to the text-based messaging platform to enable the IT user to provide natural language user responses in the text-based messaging platform, wherein the IT user is assigned to the particular pre-defined IT service and was not presently connected to the text-based messaging platform.

10. The method of claim 7, wherein the communication channel is an audio-based voice channel, and wherein parsing the natural language user request includes converting an audio-based natural language user request into text and using the NLP model to parse a text transcription of the natural language user request.

11. The method of claim 7, wherein the catalog of pre-defined IT services includes at least one of a first service for adding an alarm to a given IT network node, a second service for disabling an alarm for the given IT network node, or a third service for defining a connection between two alarms.

12. The method of claim 7, further comprising:
  subsequent to determining that the natural language user request is mappable to a particular pre-defined IT service, providing a prompt in the communication channel that requests one or more parameters for an execution of the automated process, wherein the one or more parameters includes an external Hypertext Transport Protocol (HTTP) link to a component on which to perform the pre-defined IT service.

13. The method of claim 7, further comprising:

subsequent to executing the automated process, automatically generating a data record that describes a completion of the automated process, wherein the data record includes a fillable data field that enables a user to input an indication of whether the natural language user request is resolved; and providing a link to the data record in the communication channel.

14. The method of claim 7, further comprising:

publishing the catalog of pre-defined IT services in the communication channel, wherein the natural language user request includes a selection of the particular pre-defined IT service from the catalog, wherein the catalog published in the communication channel includes multiple hierarchical menus that are navigated by successive inputs provided by a same user that provided the natural language user request.

15. The method of claim 7, wherein the fault management alarming for the multiple IT network nodes include fault management for a connection status between at least two IT network nodes via a 5G wireless network.

16. At least one non-transitory computer readable medium storing instructions that, when executed by a processor, cause the processor to:

detect a natural language user request during a monitoring of a communication channel, wherein the natural language user request references at least one of multiple IT network nodes that are configured for fault management alarming;

parse, via a natural language processing (NLP) model, the natural language user request to determine whether the natural language user request is mappable to at least one of a catalog of pre-defined IT services related to the fault management alarming of the multiple IT network nodes;

based on determining that the natural language user request is mappable to a particular pre-defined IT service, determine a complexity level of the natural language user request based on whether a present alarming state of the multiple IT network nodes is consistent with the particular pre-defined IT service, wherein determining the complexity level comprises comparing parameters extracted from the natural language user request with current states of fault management alarms associated with the multiple IT network nodes; and cause, according to the complexity level, execution of an automated process associated with the particular pre-defined IT service to perform the particular pre-defined IT service.

17. The at least one non-transitory computer readable medium of claim 16, wherein the instructions further cause the processor to:

based on the complexity level preventing the execution of the automated process, generate a data record that identifies the particular pre-defined IT service and that is flagged for a manual IT user.

18. The at least one non-transitory computer readable medium of claim 16, wherein the communication channel is a text-based messaging platform, and wherein the monitoring is performed by an application bot belonging to the text-based messaging platform.

19. The at least one non-transitory computer readable medium of claim 16, wherein the catalog of pre-defined IT services includes at least one of a first service for adding an alarm to a given IT network node, a second service for disabling an alarm for the given IT network node, or a third service for defining a connection between two alarms of the fault management alarms.

20. The at least one non-transitory computer readable medium of claim 16, wherein the instructions further cause the processor to:

subsequent to determining that the natural language user request is mappable to a particular pre-defined IT service, provide a prompt in the communication channel that requests one or more parameters for an execution of the automated process.

* * * * *